US007313230B2

(12) United States Patent
Lu et al.

(10) Patent No.: US 7,313,230 B2
(45) Date of Patent: Dec. 25, 2007

(54) GENERAL CHARGING METHOD

(75) Inventors: Zhijian Lu, Guangdon Province (CN); Xin Zhang, Guangdong Province (CN); Xiaozheng Guo, Guangdong Province (CN); Qingchen Chu, Guangdong Province (CN); Youkun Chen, Guangdong Province (CN)

(73) Assignee: Huawei Technologies Co., Ltd., Guangdong Province (CN)

( * ) Notice: Subject to any disclaimer, the term of this patent is extended or adjusted under 35 U.S.C. 154(b) by 192 days.

(21) Appl. No.: 10/558,620

(22) PCT Filed: Dec. 31, 2003

(86) PCT No.: PCT/CN03/01161

§ 371 (c)(1),
(2), (4) Date: Nov. 28, 2005

(87) PCT Pub. No.: WO2004/105315

PCT Pub. Date: Dec. 2, 2004

(65) Prior Publication Data

US 2006/0253292 A1    Nov. 9, 2006

(30) Foreign Application Priority Data

May 26, 2003    (CN)  ............................... 03 1 38392

(51) Int. Cl.
*H04M 15/00*     (2006.01)
(52) U.S. Cl. ............................ 379/114.01; 379/114.03; 379/114.06; 379/114.09; 705/34
(58) Field of Classification Search ................ 379/111, 379/112.01, 112.08, 114.01, 114.03, 114.06, 379/114.09, 115.01, 121.01, 121.04; 705/34, 705/400
See application file for complete search history.

(56) References Cited

U.S. PATENT DOCUMENTS 6,338,046 B1 *  1/2002  Saari et al.  ................... 705/34

FOREIGN PATENT DOCUMENTS

| CN | 1355647 A | 6/2002 |
|---|---|---|
| WO | WO 00/77748 A | 12/2000 |
| WO | WO 03/042885 A | 5/2003 |

* cited by examiner

*Primary Examiner*—Binh K. Tieu
(74) *Attorney, Agent, or Firm*—McDermott Will & Emery LLP

(57) ABSTRACT

The present invention provides a general charging method applicable to a charging system in the communication field, comprising steps of establishing a charging strategy and performing the charging based upon the charging strategy. The charging strategy comprises a plurality of priorities each of which comprises a plurality of periods of time, and each of the periods of time corresponds to a type of rate segmentation and is provided a plurality of rate segments in each of which there are a plurality of rates. The step of performing the charging comprises steps of: searching for the highest priority in the charging strategy; searching for a corresponding period of time in the priority based upon the time a subscriber uses a service, and if found, performing the charging based upon the rate segments in the period of time; when the charging has been completed or the priorities have been searched through, and if there is any usage quantity that can't be charged, recording it and terminating the charging. With such a structure of general charging strategy, the present invention can satisfy various charging demands and provide generality and adequate expansibility. Also, the present invention enables subscribers to configure different charging methods as needed.

7 Claims, 2 Drawing Sheets

GENERAL CHARGING METHOD

RELATED APPLICATION

This application is the U.S. National Phase under 35 U.S.C. § 371 of International Application No. PCT/CN2003/001161, filed Dec. 31, 2003, which in turn claims the benefit of Chinese Application No. 03138392.0, filed May 26, 2003, the disclosures of which Applications are incorporated by reference herein in their entirety.

FIELD OF THE INVENTION

The present invention relates to the communication field, particularly to a charging method in the communication field.

BACKGROUND OF THE INVENTION

In the highly developed information society, communication operators provide subscribers with various information services, such as the telephone service, the Internet-access service, the short-message service, as well as different charging methods.

Typical charging methods include but not limited to the following:

1. Duration-based charging: that is, the charging is based upon the time that the subscriber spends on using the service, such as the telephone service. One charging method is that during the use of the service, the charge per unit time is identical, and the charge of the session service at a time is calculated based upon the duration. Another charging method is that the entire use procedure is charged based upon time intervals, and the charge per unit time for each of the time intervals is different, for example, 0.2 yuan/minute is for the first 3 minutes and 0.3 yuan/minute is for more than 3 minutes, then the charging is performed based upon the relationships between the duration and the time intervals and using the different charges per unit time. For example, the charging method is 0.2 yuan/minute for 0-3 minutes and 0.1 yuan/minute for more than 3 minutes. If the duration at a time is 15 minutes, then the charge is 3*0.2+12*0.1=1.8 yuan.

2. Traffic-based charging: it is mainly used for the Internet-access service, and the charging is based upon the quantity of data transferred during the service used by the subscriber. One charging method is that during the service use, the charge per unit traffic is identical, and the charge of the service is calculated based upon the total traffic. Another charging method is to charge based upon traffic segments for the service use, and the charge per unit traffic is different in each of the traffic segments, for example, 0.2 yuan/KB is for the first 1 MB and 0.1 yuan/KB is for more than 1 MB, and then the total charge is calculated based upon the relationships between the total traffic used by the subscriber and the traffic segments and using the different charges per unit traffic. For example, the charging method is 0.2 yuan/KB for 0-1 MB and 0.1 yuan/KB for more than 1 MB. If 1.5 MB is used once, then the charge is 1024*0.2+0.5*1024*0.1=256 yuan.

3. Number-of-times-based charging: the short message service and the call transfer service are mostly used at present, that is, the charge of the service used each time is determined based upon the number of times that service is used.

4. Accumulative charging: the charging is based upon the total quantity of the accumulative duration, traffic or number of times for a certain service used by the subscriber, wherein the unit charge before the total quantity reaches the prescribed accumulative quantity is different from that after the total quantity reaches the prescribed accumulative quantity. For example, in the Internet-access service, 1.0 yuan/hour is for no more than 100-hour accumulative Internet-access duration, and 0.5 yuan/hour is for more than 100-hour accumulative Internet-access duration. For example, if the accumulative Internet-access duration is 70 hours, and the duration of the certain Internet-access is 15 hours, then the charge is 15*1.0=15 yuan due to 70+15<100.

Though the above charging methods meet various charging demands to some extent, they have the following drawbacks:

(1) Lack of generality: a certain charging method is often specific to a certain service. When a new service is provided, it is often unable to meet the required charging demand in the existing charging system, and thereof the existing charging method has to be modified or new charging software has to be developed. For example, if the function of "accumulative charging" has to be added to a "duration-based charging" system, and a bonus of 10-hour and free Internet-access duration is for 100-hour accumulative Internet-access duration, the existing charging method has to be modified.

(2) Complexity and disaccord of configuration methods: different charging methods have different configuration methods. It is required for the subscribers to consider how to convert the charging method into a data structure that can be processed by the software, whereas it is required for the developers to consider how to design the software structure to meet different charging demands, which is one of the major reasons why a new charging method makes it necessary to modify the existing software or develop a new software.

(3) Inflexibility of rate configuration methods: for example a charging demand is that 1.0 yuan/hour is for the Internet-access, and a bonus of 10-hour free duration is for accumulative 100-hour Internet-access duration. If the accumulative Internet-access duration of the subscriber is 98 hours and the current Internet-access duration is 3 hours, then there are two applicable charging methods:

One method is that the charge of the current 3-hour Internet-access is 3*1.0=3 yuan, and the bonus of 10-hour free duration will be used during the next Internet-access until the free hours are used up, which is referred to "later use of onus".

The other method is that for the current 3-hour Internet-access, the charge is 2*1.0=2 yuan for the 2 hours within the accumulative 100 hours, and the rest 1 hour beyond the accumulative 100 hours takes the free duration of the bonus and thus is not charged. Therefore, the charge is 2*1.0+1*0=2.0 yuan for the current Internet-access, while the remaining free Internet-access duration is recorded as 9 hours for later use, which is referred to as "instant use of bonus.

However, if either method is determined, the charging method cannot be changed to the other, otherwise the software has to be modified.

Furthermore, the existing charging methods are often specific to some certain services, that is, a charging method for one service is quite different from that for another. Therefore, if the operator provides a new service, a new charging method has to be customized, which not only increases the cost of the operator but also results in the disorder of the charging software in the market. Therefore, in order to meet the demands of the operators to develop services, it is rather advantageous for the operators and the subscribers to provide a uniform configuration and calculation method for all the charging methods and to further achieve a general charging method in a uniform structure.

SUMMARY OF THE INVENTION

The present invention provides a general charging method, which can meet all charging demands and provide adequate expansibility.

The general charging method comprises steps of establishing a charging strategy and performing the charging based upon the charging strategy. The charging strategy comprises a plurality of priorities each of which comprises a plurality of periods of time, and each of the periods of time corresponds to a type of rate segmentation and is provided a plurality of rate segments in each of which there are a plurality of rates.

The step of performing the charging comprises:

step 1: searching for the highest priority in the charging strategy;

step 2: searching for a corresponding period of time in the priority based upon the time a subscriber uses a service; if found, performing the charging based upon the rate segments in the period of time and going to step 4, otherwise going to step 3;

step 3: judging whether all the priorities have been searched through; if yes, going to step 5, otherwise searching for a next priority and going to step 2;

step 4: judging whether the charging has been completed; if completed, going to step 5, otherwise going to step 3; and step 5: judging whether there is any usage quantity that can't be charged; if yes, recording it and terminating the charging, otherwise, terminating the charging.

With such a structure of general charging strategy, the present invention can satisfy various charging demands and provide generality and adequate expansibility. Meanwhile, the configuration pattern in the general charging method is uniform, that is, there is a similar configuration pattern in the same structure regardless of various charging demands. Also, the present invention is flexible in some sense and enables subscribers to configure different charging methods as needed.

DETAILED DESCRIPTION OF THE EMBODIMENTS

Figure 1:
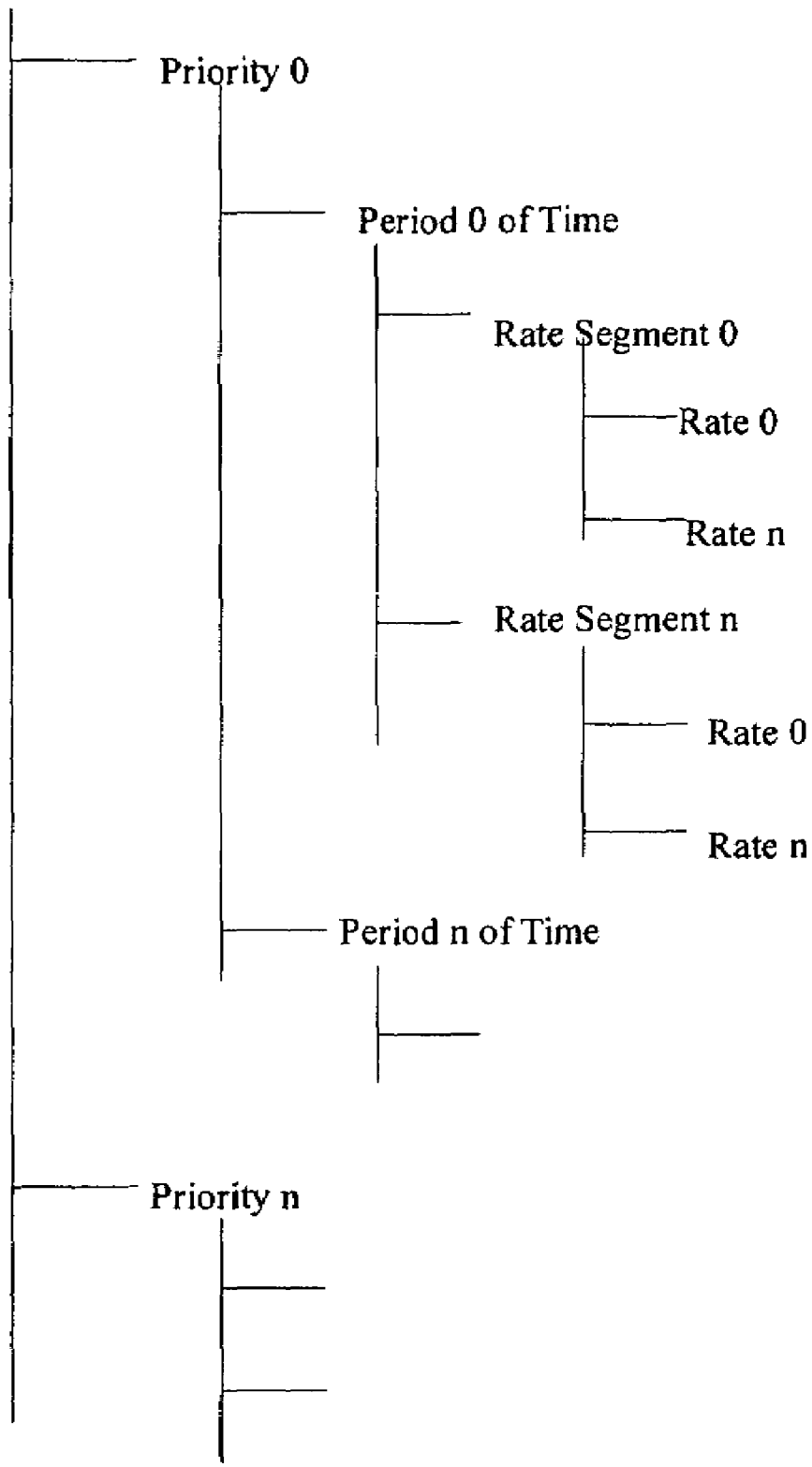
FIG. 1 is a schematic diagram of the charging strategy the charging method according to the embodiment of the present invention.

Hereunder the present invention is further detailed in the embodiment with reference to the accompanied drawings.

First the following concepts are clearly defined in order to facilitate better understanding of the charging method according to the embodiment of the present invention.

Resource: it refers to any entity that can be possessed and used by the subscriber during the charging, such as currency, free duration, accumulative Internet-access duration, accumulative charge, total disk space, available disk space or the like.

Rate: it refers to a specific way in which a certain resource is affected. For example, 1.0-yuan currency spent per hour refers to the resource of 1.0-yuan "currency" spent per hour; 0.1-yuan currency spent each time refers to the resource of 0.1-yuan "currency" spent each time; 1-hour increment of the accumulative Internet-access duration per hour refers to 1-hour increment of the resource of "accumulative Internet-access duration" per hour; and 1-hour free duration spent per hour refers to the resource of 1-hour "free duration" spent per hour.

Rate segment: It refers to a segmented interval of rate. As described above, "0.2 yuan/minute is for the first 3 minutes and 0.1 yuan/minute is for more than 3 minutes", wherein "0-3 minutes" is called a rate segment, and "more than 3 minutes" is also called a rate segment; "1.0 yuan/hour is for no more than 100-hour accumulative Internet-access duration and 0.5 yuan/hour is for more than 100-hour accumulative Internet-access duration", wherein "0-100 hours" is called a rate segment, and "more than 100 hours" is also called a rate segment, and so on.

Rate segments can be divided into two types of resource-accumulative segmentation and usage-quantity segmentation. The type of resource-accumulative segmentation refers to segmentation of a certain resource, such as "accumulative Internet-access duration of no more than 100 hours" as discussed above, and the rate segments of "0-100 hours" and "more than 100 hours" refer to the segmentation of the resource of "accumulative Internet-access duration", wherein the charging is performed through selection of a rate based upon a current value of the resource. The type of usage-quantity segmentation refers to segmentation of the once used quantity, such as "the first 3 minutes" as discussed above, and the rate segments of "0-3 minutes" and "more than 3 minutes" refer to the segmentation of the duration for this time, wherein the charging is performed based upon the segmentation of the once used quantity.

Period of time: it refers to a time interval. For example, 8:00-10:00 is a period of time, and 2002-10-01 to 2003-3-20 is also a period of time. A plurality of rate segments can be defined within a period of time. The charging is performed through searching for the corresponding rate segments within the different periods of time based upon the initial time the subscriber uses the service.

Priority: it refers to that different periods of time, rate segments and rates are combined to form different levels, each of which has a different successive relationship with another in use, and the subscriber can set the respective priorities high or low at his discretion as required. In actual applications, the process is usually performed according to the sequence from a high priority to a low priority. For example, there is a priority 0, and it comprises two periods of time, i.e. the period 0 of time and the period 1 of time, wherein the rate segments in the period 0 of time are based upon the type of the usage-quantity segmentation and comprise two rate segments; and also, the rate segments in the period 1 of time are based upon the type of the usage-quantity segmentation and comprise two rate segments. The priority can be described as follows:

Priority 0

Period 0 of time: $1^{st}$-$7^{th}$ of May

Rate segment 0: 0-3 minutes

Rate 0: 0.2-yuan currency spent per minute

Rate segment 1: after 3 minutes

Rate 0: 0.1-yuan currency spent per minute

Period 1 of time: other time
  Rate segment 0: 0-3 minutes
    Rate 0: 0.4-yuan currency spent per minute
  Rate segment 1: after 3 minutes
    Rate 0: 0.2-yuan currency spent per minute Charging strategy: it refers to a charging mechanism for a service comprising a combination of a plurality of priorities.

As shown in FIG. 1, the charging strategy comprises a plurality of priorities each of which includes a plurality of periods of time, wherein each of the periods of time has a plurality of rate segments, and each of the rate segments has a plurality of rates. One charging strategy corresponds to only one service type, and charging demands for different service can be satisfied through the charging strategies with a similar structure. Therefore, the method according to the embodiment of the present invention is general.

Figure 2:
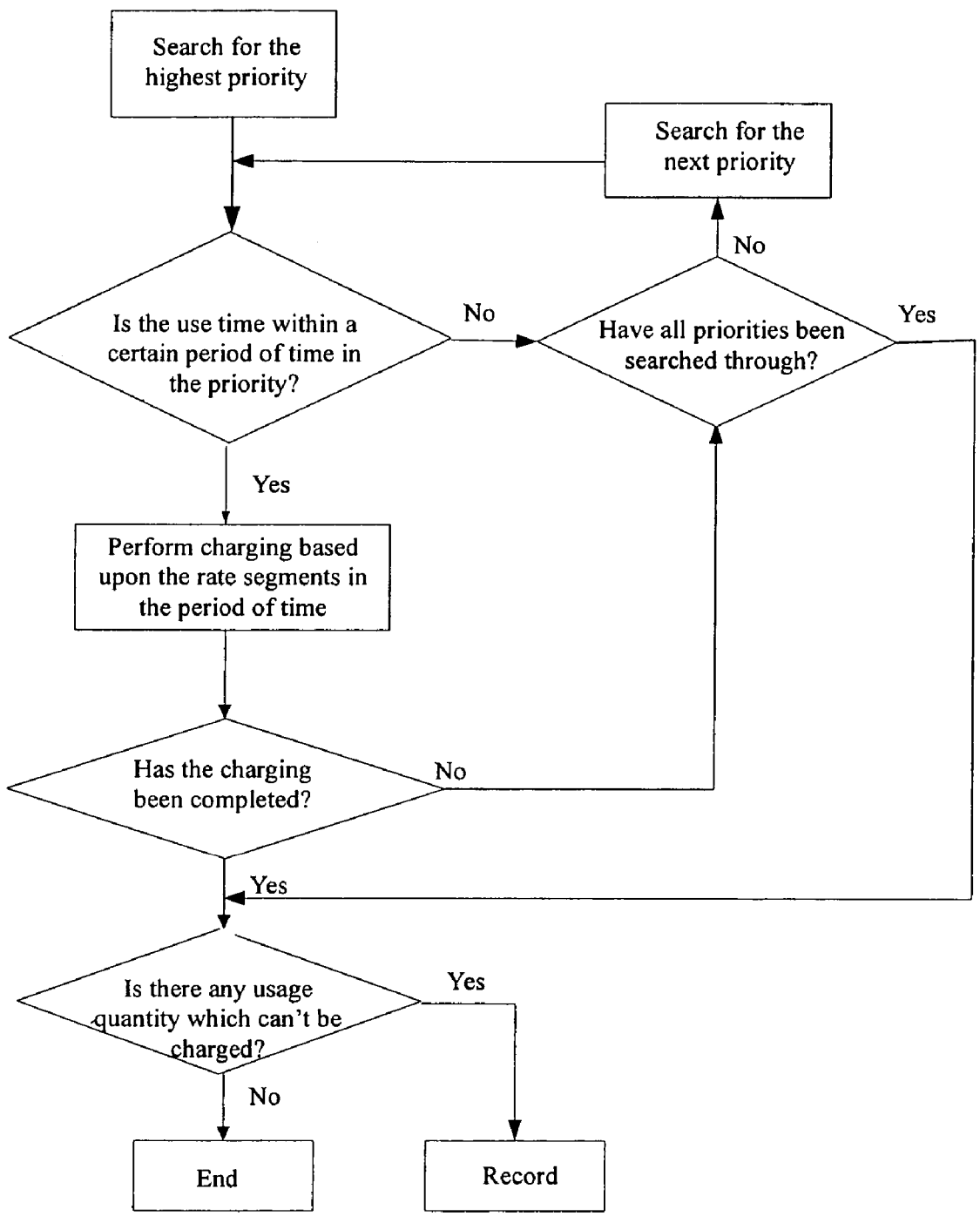
FIG. 2 is a flow diagram of the charging method according to the embodiment of the present invention.

FIG. 2 shows the flow of the charging method according to the embodiment of the present invention. First, the process finds out the highest priority in the charging strategy, and searches for the periods of time in this priority based upon the time the subscriber starts to use the service. If the time is within a certain period of time in this priority, the process performs the charging based upon the type of rate segmentation and the rate segments in this certain period of time; otherwise the process searches for the next priority. If the type of rate segmentation in the period of time, within which the time is, is "the type of resource-accumulative segmentation", then the charging is performed based upon the resource-accumulative segmentation; and if the type of rate segmentation is "the type of usage-quantity segmentation", then the charging is performed based upon the usage-quantity segmentation. If the charging can't be completed for this priority due to insufficient resource for the subscriber, a configuration error or the like, the process searches for the next priority and repeats the above steps, until the charging has been completed or all priorities have been searched through. If all priorities have been searched through and there are still some usage quantities that can't be charged, the process records these usage quantities and terminates the charging for this time.

In the case of the resource-accumulative segmentation, for example, the segments for a resource r1 are a-b, b-c and c-d, whereas a current value of the resource r1 is n. The process compares the current value n of the resource r1 with a boundary value on the left and a boundary value on the right for each segment. That is, the process judges whether it is "the boundary value on the left $\leq n<$ the boundary value on the right" or "the boundary value on the left $<n\leq$ the boundary value on the right", so as to determine which one of the segment the "n" is within, and then performs the charging based upon the rate in that segment. If the charging process makes the value of the resource r1 go beyond either boundary value of the segment, that is, smaller than the boundary value on the left or larger than the boundary value on the right, then the boundary values are truncated, and the charging for the remaining part is continued in another segment. Finally, the sum of the charges for all respective segments is the total charge.

In the case of the usage-quantity segmentation, for example, the segments are a-b, b-c, and c-d, and the currently used quantity is n. The respectively defined segments are covered with the interval of [0, n], and all or some of the covered segment are selected. Then, the charging is performed based upon the respective rates in the above segments. Finally, the sum of the charges for all the respective segments is the total charge.

Hereunder the charging method will be described according to the embodiment of the present invention.

Embodiment 1

A Charging Method of the Type of the Resource-Accumulative with a Bonus

If the charging demand is that "1.0 yuan/hour is for the Internet-access, a bonus of 10-hour free duration is for every 100-hour accumulative Internet-access, and the bonus of the free duration is available for Internet-access of the next time", then the charging strategy is first established as follows:

Priority 0
  Period 0 of time: negative infinite (−□)−positive infinite (+□)
  (The type of usage-quantity segmentation)
    Rate segment 0: 0 hour −+□
      Rate 0: 1-hour free Internet-access duration spent per hour
Priority 1
  Period of time 0: −□−+□
  (The type of resource-accumulative segmentation with the resource of accumulative Internet-access charge)
    Rate segment 0: 0-100 yuan
      Rate 0: 1.0-yuan currency spent per hour
      Rate 1: 1.0-yuan increment of the accumulative Internet-access charge per hour
    Rate segment 1: more than 100 yuan
      Rate 0: 10-hour increment of the free Internet-access duration
      Rate 1: 100-yuan reduction of the accumulative Internet-access charge The charging process is as follows: when the subscriber accesses the Internet for the first time, the value of the resource of "accumulative Internet-access charge" is 0, and the value of the resource of "free Internet-access duration" is 0. If the current Internet-access duration of the subscriber is 150 hours, the process first finds out the priority 0 and the period 0 of time based upon the type of usage-quantity segmentation in this priority, and further finds out the rate segments and the rates in this period of time. Since the value of the resource "free Internet-access duration" for the current subscriber is 0, the charging can't be performed, and thus the process searches for the next priority. The process finds out the period 0 of time based upon the type of resource-accumulative segmentation in the priority 1, and further finds out the rate segment 0 in accordance with the current value 0 of the resource "accumulative Internet-access charge" to perform the charging. When the Internet-access duration reaches 100 hours, 100-yuan currency is spent, the charge of the accumulative Internet-access counts up to 100 yuan, and thus the remaining 50 hours need to be charged in the rate segment 1. In the rate segment 1, 10 hours are added to the subscriber resource of "free Internet-access duration", and the "accumulative Internet-access charge" is reduced by 100 yuan. Since the rate segment in that period of time is not related to the Internet-access duration, the remaining 50 hours have not been charged yet. In such a case, the value of "accumulative Internet-access charge" is changed to 0, and the process goes on the charging in the rate segment 0. In the rate segment 0, the above steps will be repeated until the charging has been completed. Finally, the resultant charge is determined as 150-yuan currency, the accumulative Internet-access charge is determined as 50 yuan, and the free Internet-access duration is determined as 10 hours.

When the subscriber accesses the Internet for the second time and the Internet-access duration is 30 hours, then the charging will be first performed in the priority 0. Since the value of the resource "free Internet-access duration" for the current subscriber is 10, only 10 hours will count in that priority, and the remaining 20 hours will be charged in the next priority. The charging process in the priority 1 is similar to the charging process described above. Therefore, the resultant charge is that 20-yuan currency is spent, 10-hour free Internet-access duration is spent, and the accumulative Internet-access charge is increased by 20 yuan to become 70 yuan.

It shall be appreciated that the above embodiment is merely illustrative of but not limits the technical solutions of the present invention. Although the present invention has been detailed with reference to the preferred embodiment, those skilled in the art shall understand that various modifications and the equivalents thereof will be made without departing from the spirit and scope of the technical solutions, and will be covered by the appended claims of the present invention.

The invention claimed is:

1. A general charging method comprising steps of establishing a charging strategy and performing the charging based upon the charging strategy, wherein:
   the charging strategy comprises a plurality of priorities each of which comprises a plurality of periods of time, and each of the periods of time corresponds to a type of rate segmentation and is provided a plurality of rate segments in each of which there are a plurality of rates;
   the step of performing the charging comprises:
   step 1: searching for the highest priority in the charging strategy;
   step 2: searching for a corresponding period of time in the priority based upon the time a subscriber uses a service; if found, performing the charging based upon the rate segments in the period of time and going to step 4, otherwise going to step 3;
   step 3: judging whether all the priorities have been searched through; if yes, going to step 5, otherwise searching for a next priority and going to step 2;
   step 4: judging whether the charging has been completed; if completed, going to step 5, otherwise going to step 3; and
   step 5: judging whether there is any usage quantity that can't be charged; if yes, recording it and terminating the charging, otherwise, terminating the charging.

2. The charging method of claim 1, wherein the types of rate segmentation comprise the type of resource-accumulative segmentation and the type of usage-quantity segmentation;
   the type of resource-accumulative segmentation refers to segmentation of a certain resource, wherein the charging is performed through selection of a rate based upon a current value of the resource; and
   the type of usage-quantity segmentation refers to segmentation of the usage quantity, wherein the charging is performed through selection of a rate based upon the once used quantity.

3. The charging method of claim 2, wherein the charging based upon the rate segments in step 2 further comprises steps of:
   if the type of rate segmentation in the period of time, within which the time is, is the type of resource-accumulative segmentation, performing the charging based upon the resource-accumulative segmentation;
   if the type of rate segmentation is the type of usage-quantity segmentation, performing the charging based upon the usage-quantity segmentation; and
   if the charging can't be completed in the priority due to insufficient resource for the subscriber or a configuration error, going on the search for the next priority.

4. The charging method of claim 2, wherein the charging process based upon the type of resource-accumulative segmentation comprises steps of:
   comparing a current value of the resource with a boundary value on the left and a boundary value on the right for each of the rate segments, i.e., judging whether the current value of the resource is not smaller than the boundary value on the left of the segment and smaller than the boundary value on the right of the segment or the current value of the resource is larger than the boundary value on the left of the segment and not larger than the boundary value on the right of the segment;
   determining which one of the rate segments the current value of the resource is within;
   performing the charging based upon the rates in the segment;
   if the charging process makes the value of the resource go beyond either boundary of the segment, i.e., smaller than the boundary value on the left or larger than the boundary value on the right, truncating the boundary value, and going on the charging for the remaining value of the resource in another segment; and
   taking the sum of the charges of all the respective segments as a total charge.

5. The charging method of claim 3, wherein the charging process based upon the type of usage-quantity segmentation comprises steps of:
   comparing a current value of the resource with a boundary value on the left and a boundary value on the right for each of the rate segments, i.e., judging whether the current value of the resource is not smaller than the boundary value on the left of the segment and smaller than the boundary value on the right of the segment or the current value of the resource is larger than the boundary value on the left of the segment and not larger than the boundary value on the right of the segment;
   determining which one of the rate segments the current value of the resource is within;
   performing the charging based upon the rates in the segment;
   if the charging process makes the value of the resource go beyond either boundary of the segment, i.e., smaller than the boundary value on the left or larger than the boundary value on the right, truncating the boundary value, and going on the charging for the remaining value of the resource in another segment; and
   taking the sum of the charges of all the respective segments as a total charge.

6. The charging method of claim 2, wherein the charging process based upon the type of usage-quantity segmentation comprises steps of:
   covering the respective rate segments based upon a value of the usage quantity;
   selecting segments which are entirely or partially covered;
   performing the charging based upon the respective rates in the rate segments; and taking the sum of the charges of all the respective segments as a total charge.

7. The charging method of claim 3, wherein the charging process based upon the type of usage-quantity segmentation comprises steps of:

covering the respective rate segments based upon a value of the usage quantity;

selecting segments which are entirely or partially covered;

performing the charging based upon the respective rates in the rate segments; and taking the sum of the charges of all the respective segments as a total charge.

* * * * *